United States Patent [19]

Fay

[11] Patent Number: 5,411,390

[45] Date of Patent: May 2, 1995

[54] APPARATUS FOR PRODUCING SHAPED PRODUCTS

[76] Inventor: Rudolph J. Fay, 6911 Wildflower Trail, Cincinnati, Ohio 45230

[21] Appl. No.: 152,858

[22] Filed: Nov. 15, 1993

[51] Int. Cl.⁶ .............................................. B29C 43/00
[52] U.S. Cl. .................................. 425/145; 425/186; 425/220; 425/362; 425/367; 426/512
[58] Field of Search ............... 425/145, 186, 194, 220, 425/362, 363, 367, 375; 426/503, 512

[56] References Cited

U.S. PATENT DOCUMENTS

| | | | |
|---|---|---|---|
| 453,218 | 6/1891 | Stockwell | 425/194 |
| 713,570 | 11/1902 | Monroe | 425/220 |
| 1,168,075 | 1/1916 | Hutzen | 425/194 |
| 1,652,226 | 12/1927 | Werner et al. | 425/363 |
| 2,666,399 | 1/1954 | Pereyra | 425/194 |
| 4,155,691 | 5/1979 | Ridgeway et al. | 425/220 |
| 4,212,609 | 7/1980 | Fay | 425/362 |
| 4,478,565 | 10/1984 | Thompson | 425/145 |
| 4,573,898 | 3/1986 | Jones et al. | 425/145 |
| 4,692,107 | 9/1987 | Morikawa et al. | 425/145 |
| 4,957,425 | 9/1990 | Fay | 425/362 |
| 5,268,187 | 12/1993 | Quinlan | 425/367 |

FOREIGN PATENT DOCUMENTS 2052350 3/1983 United Kingdom .

*Primary Examiner*—Charles S. Bushey
*Attorney, Agent, or Firm*—Wood, Herron & Evans

[57] ABSTRACT

A machine for producing configurated products including a rotary die roll having die cavities therein and a pair of feed rollers for feeding viscous product into the die cavities. The feed rollers may be easily moved away from the die roll and the die roll may be rolled out of the machine to allow replacement thereof. Relief members extend from a backing knife between adjacent die cavities of each row as the die roll rotates. These pressure relief pads reduce the amount of product contained in the pressure chamber and thereby reduce the amount of working of the material as it is forced into the die cavities. The machine includes a front shearing knife having removable and replaceable shearing inserts. The feed rolls of the machine include longitudinally extending tapered recesses with opposed recesses of the respective feed rolls being staggered at the inlet of the pressure chamber to cause particulates within the feed product to be more easily fed into the pressure chamber with less resulting damage. The motor which drives the feed rolls is a torque controlled, variable speed motor which lessens the stresses associated with feeding large amounts of product through the pressure chamber and/or feeding highly viscous product through the pressure chamber.

36 Claims, 4 Drawing Sheets

APPARATUS FOR PRODUCING SHAPED PRODUCTS

BACKGROUND OF THE INVENTION

The present invention relates to a method and apparatus for producing specifically shaped products and, more particularly, to the production of food products within configured die cavities such that the food products have specific shapes and weights.

U.S. Pat. Nos. 4,212,609 and 4,957,425 disclose methods and machines for producing configurated and specified weight products in die cavities of a rotary die roll, each of the die cavities being defined by a configurated side wall and a porous bottom wall. The machines disclosed in each of these patents work on similar principles such that during each revolution of the die roll a batch of product is forced into each cavity as the cavities pass beneath a feed hopper. Upon continued rotation of the die roll, the bottom walls of the cavity are moved outwardly so as to force the configurated products from the die cavities. Simultaneously with the outward movement of the cavity bottom wall, air is directed through the porous bottom walls so that the configurated product is forced off of the wall and onto a conveyor located beneath the die roll.

The die cavities of the rotary die rolls disclosed in each of the above-identified patents are arranged in longitudinal rows circumferentially spaced about the periphery of the die roll. One problem associated with the arrangement of the two feed rolls and the die roll disclosed in each of the above patents is that excessive pressure can build up in the space between the feed rolls and the die roll which causes the product contained therebetween to become excessively worked and hardened. U.S. Pat. No. 4,957,425 discloses a backing knife or seal which occupies approximately one half of the volume of the generally triangular pressure chamber created between the feed rolls and the die roll. However, the size of the backing knife or seal is limited in that it does not and cannot extend too far into the pressure chamber without interfering with the path which the product must take to the die cavities and thereby decreasing the time available for loading the die cavities with a proper amount of product.

Another problem associated with such past machines is associated with their ability to easily enable changeover or maintenance of the die roll. In this regard, disengagement of the feed rolls from the die roll and removal of the die roll from the machine to allow it to be replaced with another die roll which, for example, forms differently shaped products is a difficult and involved procedure.

The above-mentioned patents further do not provide a cost efficient manner of replacing the shearing element of the front shearing knife. The front shearing knives disclosed in each of the above patents are one piece units which must be replaced in their entirety if, for example, the shearing surface is damaged by solid particulates, such as bone pieces, in the product. Frequent replacement of the entire front shearing knife is cost inefficient both in terms of the machine down time involved as well as the expense of the shearing knife itself.

While the above patents also disclose the use of tapered longitudinal recesses in the feed rolls to aid in feeding product into the pressure chamber and against the die roll, recesses of each feed roll are in line with one another and directly opposed to one another as they meet at the point where product is fed into the pressure chamber above the die roll. The problem with having such aligned, opposed recesses in the feed rolls is that particulates within the product can get caught in the spaces between the recesses and get crushed during the feeding process. That is, at the points between opposed smooth surfaces of the feed rolls, the spacing between the feed rolls may be much smaller than the particulates in a given food product. Thus, when particulates having dimensions greater than this space get caught therein during the feeding process, they will be crushed as they are forced between the feed rolls. This is undesirable in applications requiring that the particulates, such as nuts, candy, etc., remain intact and uncrushed as the food product, such as cookie dough, is shaped by the machine.

Finally, past forming machines have used motors which maintain constant speed as they drive the die roll as well as the feed rolls. The speed motors are chosen so as to maintain product within the pressure chamber above the die roll and force that product downwardly into the die cavities of the die roll as those cavities move past the pressure chamber. The use of such motors operating at a constant speed while driving the feed rolls, however, can cause the torque on the motors to become too high in certain applications and situations. More specifically, if the feed rolls are suddenly subjected to a large amount of product being deposited into the feed hopper or, for example, higher viscosity product being directed between the feed rolls, the resulting torque on the motor or motors driving the feed rolls will increase and may result in either reducing motor life or in complete motor burn out.

SUMMARY OF THE INVENTION

It has therefore been an objective of this invention to provide a new and improved machine for producing configurated products in die cavities of a die roll, which machine overcomes the problems described hereinabove.

More specifically, it has been one objective of this invention to provide a new and improved machine for producing configurated products in die cavities of a die roll wherein the feed rollers may be easily moved away from the die roll and wherein the die roll may be easily removed and replaced.

Another objective of this invention has been to provide a new and improved machine for producing configurated products in die cavities of a die roll wherein the die cavities are arranged in longitudinally extending rows and in circumferential columns and wherein a relief member is disposed between adjacent columns of die cavities as the die roll rotates to prevent overworking of the product by the machine.

Still another objective of this invention has been to provide a new and improved machine for producing configurated products and die cavities of a die roll wherein the machine includes a front shearing knife having removable and replaceable shearing inserts which, especially when taken in conjunction with the easy access provided by the moveable feed rolls and die roll, may be easily replaced whenever necessary.

Still another objective of this invention has been to provide a new and improved machine for producing configurated products in die cavities of a die roll wherein the feed rolls of the machine include longitudinally extending recesses with opposed recesses of the respective feed rolls being staggered at the inlet of the pressure chamber such that product is more easily fed into the pressure chamber and, when using product with particulates contained therein, is fed with less resulting damage to the particulates contained therein.

Still another objective of this invention has been to provide a new and improved machine for producing configurated products in die cavities of a die roll wherein the motor which drives the feed rolls is torque controlled and automatically speed variable during operation thereof to avoid the stresses associated with having large amounts of product in the feed hopper of the machine and/or highly viscous product in the feed hopper of the machine.

The apparatus of the present invention which accomplishes these objectives comprises a rotary die roll which has longitudinally extending rows and circumferentially extending in line columns of die cavities located about the circumference of the die roll. During each revolution of the roll, a batch of viscous, fluid product is forced into each cavity as the cavities pass through a pressure chamber defined between the die roll and a pair of feed rolls. Upon continued rotation of the die roll, the filled cavities move past a cut-off knife located in the nip between the downstream feed roll and the die roll. That cut-off knife is operative to shear excess product from the top of the filled die cavities. Thereafter, and upon continued rotation of the die roll, gas is forced through the porous bottom walls of the die cavities as the bottom walls are extended outwardly so that the configurated product is forced out of the die cavities and off of the bottom walls of the cavities onto a conveyor located beneath the die roll.

In a first aspect of the invention, at least one of the feed rolls is mounted in tracks disposed on opposite ends of the machine for allowing movement of that feed roll toward and away from the die roll and, in addition, the die roll is mounted on tracks to allow it to be rolled out of the machine. Preferably, both feed rolls are mounted in tracks located at their opposite ends and a powered lift mechanism is provided for lifting each of these feed rolls out of the way of the die roll such that the die roll may be easily rolled out of the machine on its pair of supporting rails. The lift mechanism preferably comprises a pair of fluid powered cylinders and, more specifically, pneumatic, having respective piston rods which are connected to respective ends of the feed rolls by chains located on each side of the machine. The tracks which guide each of the feed rolls preferably extend in a vertical direction while the rails which guide the die roll preferably extend in a horizontal direction.

In another aspect of the invention a plurality of relief members are provided and extend from a backing or knife seal into the pressure chamber to reduce the volume thereof. The relief members are equal in number to the number of spaces between adjacent columns of die cavities on the die rolls. The relief members significantly reduce the effective volume of the pressure chamber and thereby help prevent over-working the product, but they do not interfere with product being fed into the die cavities or, in other words, decrease the time available to load the die cavities, since they are located between adjacent die cavities and not over the cavities. These relief members are preferably formed integrally with the backing knife or seal and include side surfaces which taper outwardly from a top surface thereof to help direct product into the die cavities.

In another aspect of the invention, the front cut-off knife has a body which may be formed, for example, from Nylon and further includes a plurality of removable shearing inserts which are also preferably formed from Nylon. Each insert provides a shearing surface over a column of die cavities on the die roll. The inserts may be individually removed and replaced, as necessary, after lifting the feed rolls and rolling the die roll out of the machine to provide access thereto.

In another aspect of the invention, the recesses of the respective feed rolls are staggered with respect to one another such that, at their closest point to one another at the inlet to the pressure chamber, an outer longitudinal edge of a recess on one feed roll will be directly opposed to an intermediate point, and more preferably, to an approximate midpoint of a recess on the other feed roll as viewed in cross section. This staggered relationship has been found to greatly aid in feeding slippery products such as ground meat as well as product containing particulates into the pressure chamber.

In another aspect of the invention, a torque controlled DC motor is advantageously used to drive the feed rolls. The torque controlled DC motor allows the operator to set the specific torque value which causes the die cavities to be sufficiently filled with product and then allows the motor speed to automatically vary to maintain the torque constant as the head pressure, i.e., the quantity of product in the feed hopper, varies and as the viscosity of the product being fed between the feed rolls varies. Since torque on the motor remains constant, motor life is significantly extended.

DETAILED DESCRIPTION OF THE PREFERRED EMBODIMENTS

Figure 1:
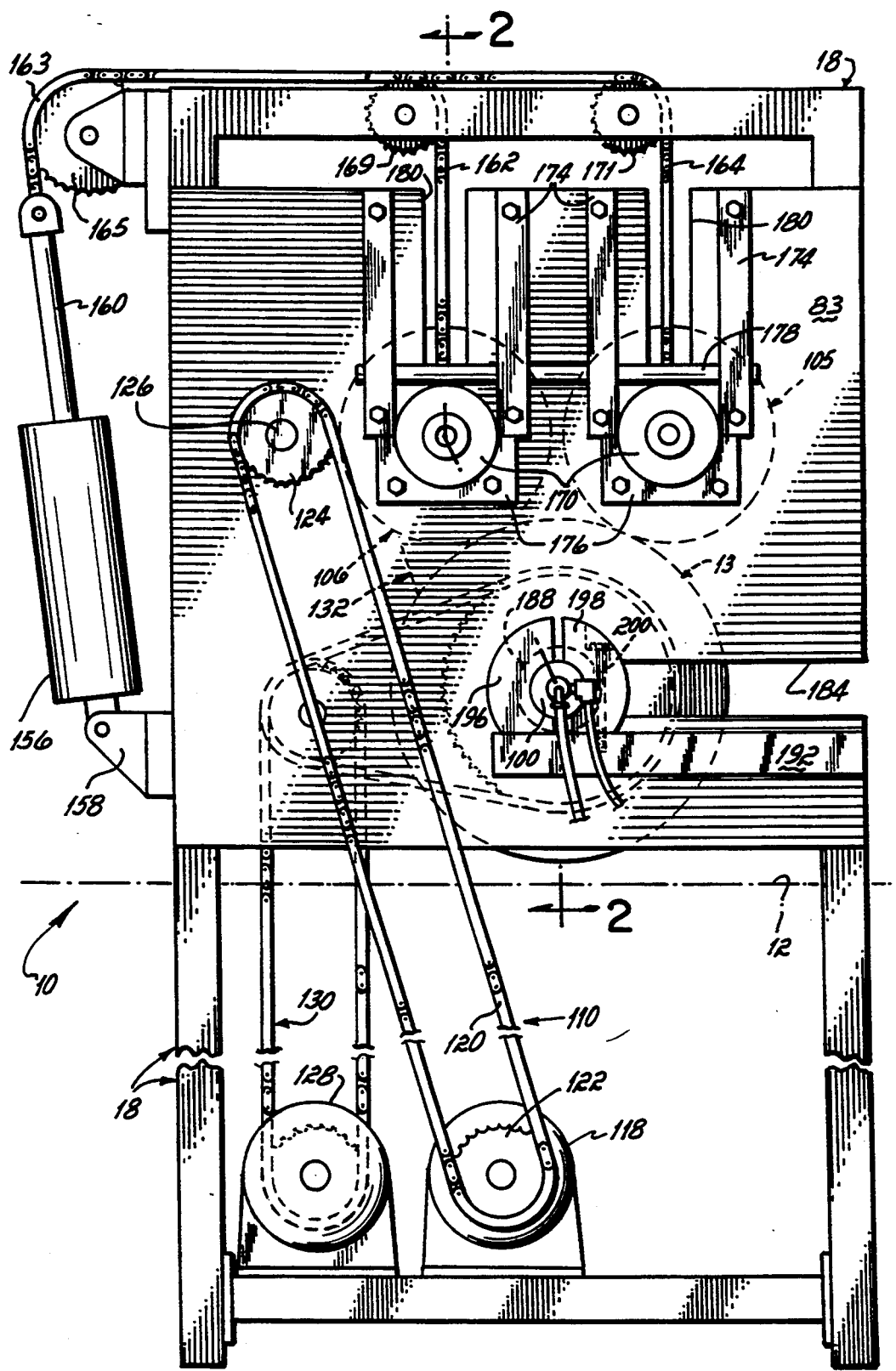
FIG. 1 is an elevated side view of an apparatus constructed according to the preferred embodiment of the invention.
Figure 2:
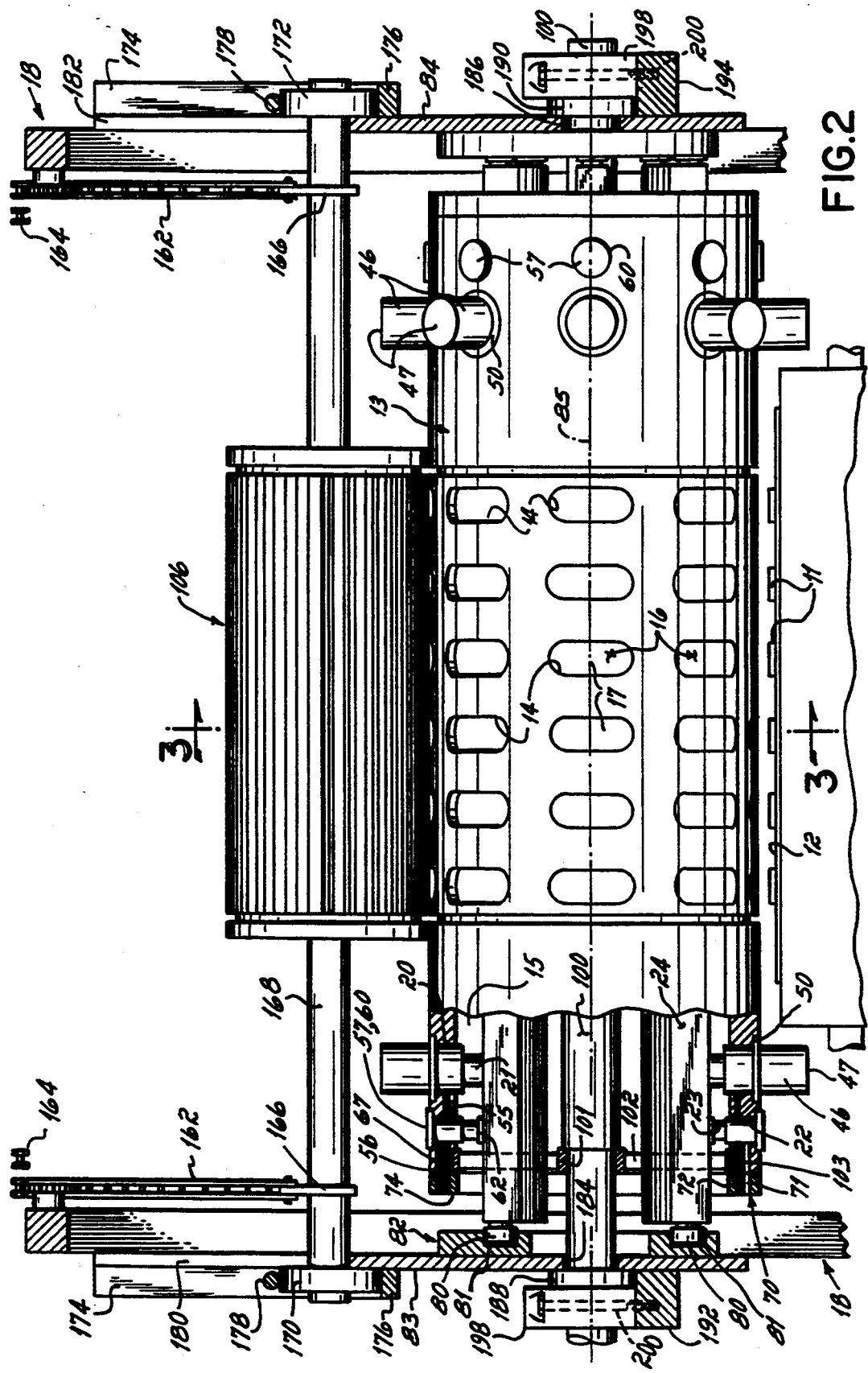
FIG. 2 is a cross-sectional view of the apparatus taken generally along line 2—2 of FIG. 1.
Figure 3:
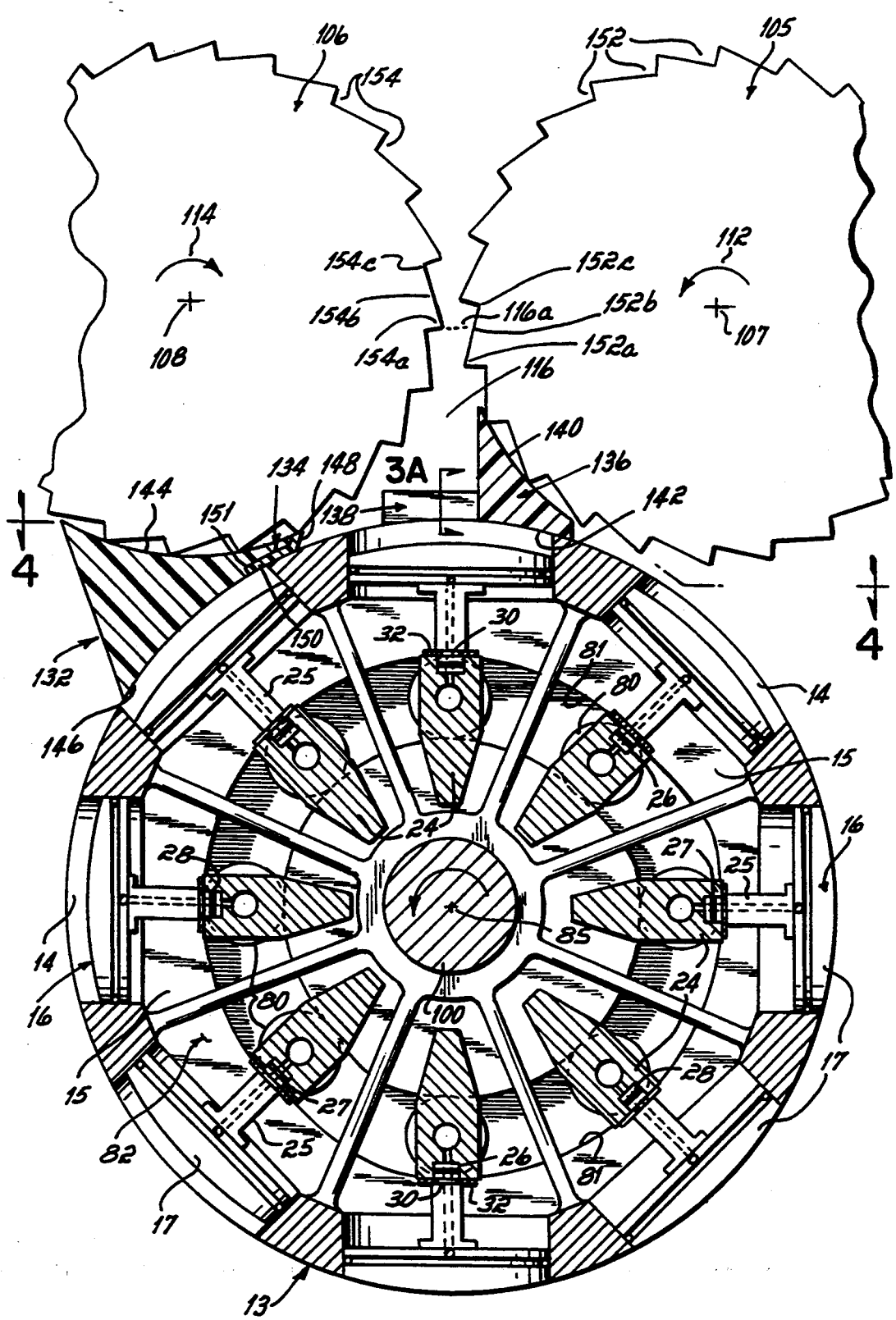
FIG. 3 is a cross-sectional view of the apparatus taken along line 3—3 of FIG. 2.

Referring first to FIGS. 1, 2 and 3, there is illustrated a preferred embodiment of a machine 10 of the present invention. The machine 10 is illustrated as being used to make up elongated food product patties such as candy patties 11 and to deposit them on a conveyor 12 as the conveyor 12 moves beneath a rotary die roll 13 (FIG. 2). Aside from the mentioned candy patties 11, the machine 10 could as well be used to create other forms of configurated products, such as cookies from cookie dough or sausage or meat patties from ground meat, and such configurated products could also be deposited onto other substrates on a conveyor belt, such as onto conveyorized dough products, etc.

The general design and operation of the rotary die roll 13 of the present invention is the same as that shown in U.S. Pat. No. 4,957,425 (the '425 patent), issued to the present inventor, and hereby expressly incorporated by reference herein. Many of the details of the machine 10 are not described in detail herein as these details do not form part of the present invention, however, such details are fully described in the '425 patent. The rotary die roll 13 of the machine 10 is rotatably mounted to a stationary frame 18 and includes a plurality of radial cavities or openings 14 which extend from the periphery of the die roll 13 into the hollow interior 15 thereof. As shown specifically in FIG. 2, the cavities or openings 14 are arranged about the die roll 13 in a series of longitudinal rows and circumferential columns. Of course, in practicing certain aspects of the invention the cavities 14 may be arranged in any desired pattern and may be shaped into any desired peripheral configuration.

As shown in FIG. 3, piston heads 16 are slidably mounted within each of the die cavities 14. On its outer end, each die piston 16 supports a gas pervious sintered metal die 17 through which air or other gas is directed into the cavities 14 from the underside of the sintered metal die 17, in a manner further described below and as more greatly detailed in the '425 patent.

As shown in FIG. 2, in addition to the rows and columns of cavities 14 for supporting the die pistons 16 and sintered metal dies 17, near each end of the die roll 13 there is the first circumferential column of cavities 20 which slidably supports guide rods 21, and a second circumferential column of cavities 22 which slidably supports gas supply pistons 23. The guide rod receiving cavities 20 and the gas supply cavities 22 of the die roll 13 are equal in number to the number of rows of die cavities 14 and are longitudinally aligned with these rows of die cavities 14.

As further shown in FIG. 3, located within the die roll 13 interiorly of each row of longitudinally aligned die cavities 14 are a plurality of flight bars 24. These flight bars 24 generally extend for the length of die roll 13 and function to support the inner ends of the rods 25 of pistons 16, the guide rods 21 and the gas supply pistons 23. To this end, the flight bars 24 have longitudinal rows of holes 26 formed therein for the reception of the inner ends of the longitudinal rows of piston rods 25. The inner ends of the piston rods 25 have annular grooves 27 formed therein for receiving O-rings 28 which form a seal between the inner end of each piston rod 25 and its corresponding hole 26. The inner end of each piston rod 25 has an annular groove 30 formed therein. The groove 30 functions to receive an arcuate section of a locking bar 32 which locks the inner ends of the piston rods 25 to the flight bars 24 as more greatly detailed in the '425 patent.

Referring back to FIG. 2, the guide rods 21 are slidably mounted within cylinders 46. The cylinders 46 are tubular in shape and have a closed outer end 47. The cylinders 46 are secured to the periphery of the die roll 13 by machine screws (not shown) which extend through a peripheral annular flange 50 of the cylinders 46 and are threaded into threaded bores of the die roll 13. As explained further in the '425 patent, each cylinder 46 includes various grooves and bores which communicate with a lubricating oil passage 55 interconnecting one end 56 of die roll 13 with a guide rod lubricating port (not shown) of each cylinder 46.

Mounted in each of the gas supply cavities 22 of the die roll 13 there is a closed end cylinder 57. Each cylinder 57 has an internal bore within which the gas supply pistons 23 are slidable. To secure the cylinders to the die roll 13, each cylinder 57 has a radial flange 60 through which machine screws (not shown) extend and are threaded into threaded bores of the die roll 13. In order to secure the gas supply pistons 23 to the flight bars 24, there is a C-ring 62 which extends into an annular groove of the piston 23. This C-ring 62 is in turn secured to the flight bar 24 by a screw (not shown).

Mounted on one end of the rotary die roll 13 there is a port plate 70 which is fixedly secured to and rotates with the die roll 13. The port plate 70 has longitudinally extending passages 71, 72 which are also longitudinally aligned with and in fluid communication with the air and oil flow passages 67, 55, respectively, in the die roll 13. As detailed in the '425 patent, air at a pressure above that of the atmosphere, as for example, at 50 pounds per square inch is supplied through passages 71 of the port plate 70, and oil or lubricant is supplied through the passage 72 as those passages of the port plate 70 move past an air and lubricant supply shoe (not shown). The supply shoe is sealingly engaged with the outermost side edge 74 of the port plate 70. As detailed in the '425 patent, air and lubricant supply passages 71, 72 supply necessary pressurized air and lubricant to the pistons 16, flight bars 24 and cylinders 46.

As further shown in FIG. 2, each flight bar 24 rotatably supports guide rolls 80 at opposite ends thereof. Each of these guide rolls 80 moves within an eccentric cam slot 81 (FIG. 3) of a cam 82 secured to opposite side plates 83, 84 of the frame 18 of the machine 10. As the die roll 13 rotates, it causes the die pistons 16 and connected guide rods 21 to rotate with it. In the course of rotating about the axis 85 of the die roll 13, the guide rollers 80 attached to the ends of the flight bars 24 are caused to follow the cam slot 81. Because of the eccentricity of the slot 81 about the axis 85, the flight bars 24 and attached die pistons 16 and guide rods 21 are caused to move toward and away from the axis 85 as the respective guide rolls 80 at the outer ends of the flight bars 24 make a complete revolution about the die roll axis 85. This results in the sintered die 17 attached to the outer ends of the piston 16 being moved in and out relative to the die cavities 14.

The die roll 13 is supported for rotation upon a central shaft 100, the axis of which is coincident with the axis 85 of the die roll 13. This shaft is connected to the interior of the die roll 13 by hubs 101 and radial spokes 102 which extend between the hub 101 and an annular ring 103 fixed to the interior of the die roll 13. On its opposite ends, the drive shaft 100 is rotatably supported from the side plates 83, 84 of the frame 18.

Referring now to FIGS. 2 and 3, a pair of feed rolls 105, 106 are mounted to the frame 18 for rotation above the die roll 13. The feed rolls 105, 106 have respective axes of rotation 107, 108. The feed rolls 105, 106 are driven by a suitable chain and gear drive system 110 (FIG. 1) such that the feed rolls 105, 106 rotate in opposite directions indicated by arrows 112, 114 in FIG. 3. Rotation of feed rolls 105, 106 in the directions of arrows 112, 114 feeds product contained within a product hopper (not shown) disposed above the feed rolls 105, 106 down into a generally triangular cavity or pressure chamber 116 defined by the peripheral surfaces of the feed rolls 105, 106 and the peripheral surface of the die roll 13.

The chain and gear drive system 110 is powered by a DC motor 118 mounted at the base of the machine 10. The DC torque controlled motor 118 may, for example, be a model DC 1 drive manufactured by Reliance Electric Company and including a torque controller which allows a specific maximum torque value to be set and further allows the speed thereof to automatically vary while maintaining the torque value substantially constant. A chain 120 is connected to a sprocket 122 fixed to the output shaft of the DC motor 118 and is connected at its upper end to a second sprocket 124 fixed to a shaft 126 which drives a gear system (not shown), which is preferably the gear system shown in the '425 patent, located on the opposite side of the machine 10 and operative to drive feed rolls 105, 106 in opposite directions as indicated by arrows 112, 114. The DC torque controlled motor 118 provides a unique drive for the feed rolls 105, 106 which prevents motor burn out due, for example, to high amounts of feed product (or high "head pressure"), or to highly viscous product being fed between the feed rolls 105, 106. To operate the torque controlled DC motor 118, the operator starts the machine such that product is fed into die cavities 14 in predetermined desired amounts. Then, the torque value representative of the motor operation while feeding this desired amount of product is set and the machine 10 is operated while allowing the torque controlled motor 118 to vary the speed of the feed rollers 105, 106 automatically while maintaining the torque substantially constant. Preferably, the step of initially filling the cavities 14 with a predetermined desired amount of product involves somewhat overfilling the cavities 14 with product then slightly "backing off" or reducing the torque setting such that the cavities 14 are filled with the proper level or amount of product during subsequent operation of the machine 10. As further shown in FIG. 1, a second motor 128 which may, for example, be a variable speed AC motor, is used to drive the die roll 13 by way of a suitable chain and sprocket system 130. The speed of rotation of the die roll 13 may be adjusted with respect to the speed of the conveyor 12 to vary the spacing between shaped products 11 in the columns of products 11 being deposited by the die roll 13.

Referring again to FIG. 3, a front cut-off knife 132 is located at the downstream edge of the pressure chamber 116. The cut-off knife 132 acts as a seal between the downstream one of the feed rolls 106 and the die roll 13 at the nip between these two rolls. The cut-off knife 132 also functions to force product within the pressure chamber 116 into the die cavities 14 of the die roll 13 as the cavities move past the cut-off knife 132. As explained further below, the cut-off knife 132 includes removable shearing knife inserts 134. At the upstream edge of the pressure chamber 116, there is a backing knife 136 located in the nip between the upstream feed roll 105 and the die roll 113. The backing knife 136 functions as a seal in that nip and extends a short distance into the pressure chamber 116.

Figure 3A:
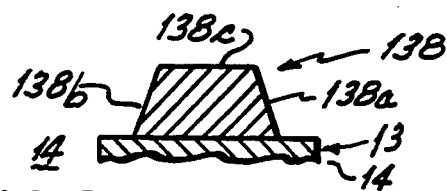
FIG. 3A is a cross-sectional view of a relief pad of the invention taken along the line 3A of FIG. 3.
Figure 4:
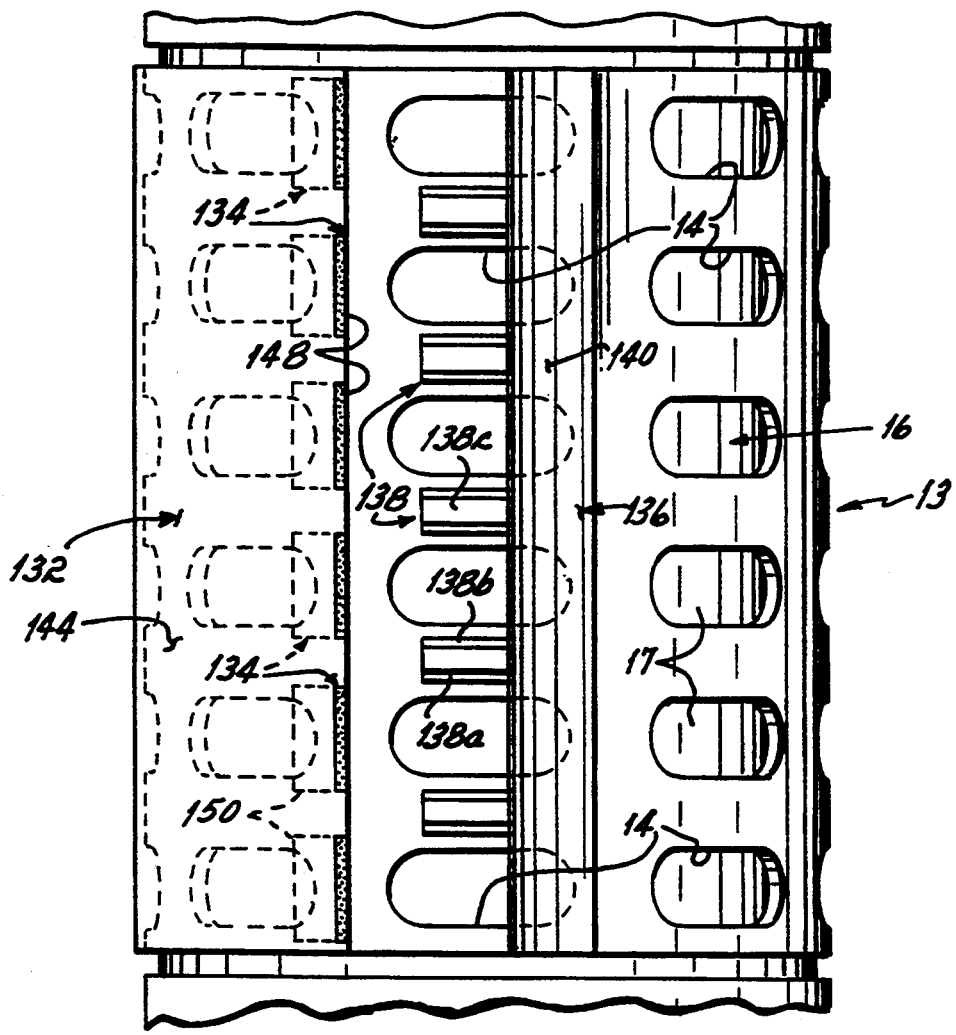
FIG. 4 is a top view of the die roll of the apparatus taken generally along line 4—4 of FIG. 3.

As shown in FIGS. 3, 3A and 4, the backing knife 136 includes a plurality of relief pads 138 extending into the pressure chamber 116 and between adjacent die cavities 14 of the die roll 13. As shown in FIG. 3A, the relief pads 138 have side surfaces 138a, 138b which taper outwardly from a top surface 138c thereof to help direct product into the die cavities 14 located adjacent the side surfaces 138a, 138b. The relief pads 138 take up volume within the pressure chamber 116 which would otherwise be taken up by product located therein. Thus, product contained within the pressure chamber 116 is not worked and does not become as hard from working as is the case when the pressure chamber 116 is allowed to contain substantially more product therein. Since less product may be contained within the pressure chamber 116, the opportunity for product to be worked while flowing therethrough is lessened. Furthermore, since the relief pads 138 extend between adjacent die cavities 14 and not over the cavities, the relief pads 138 do not obstruct the flow of product as it is forced into the die cavities 14 and therefore do not decrease the time available to fill the die cavities 14.

As specifically shown in FIG. 3, the upper surface 140 of the backing knife 136 is generally arcuate in configuration and conforms in this area to the radius of the feed roll 105 against which the upper surface 140 rides and forms a seal. Similarly, the lower surface 142 of the backing knife 136 is arcuate in configuration and is of the same radius as the die roll 13 so that it effectively forms a seal between the die roll 13 and the backing knife 136.

The front cut-off knife 132 also includes a pair of arcuate surfaces 144, 146 which conform, respectively, to feed roll 106 and die roll 113 to form seals therewith. Referring to FIGS. 3 and 4, the removable shearing knife inserts 134 each include a leading tapered knife edge 148 which preferably tapers upwardly and inwardly toward the pressure chamber 116 and functions to shear product from the mass of product contained in the pressure chamber 116 and the product contained in the die cavity 14 as the die cavity passes the knife edge 148. As shown in FIG. 4, each shearing knife insert 134 further includes a tab portion 150 which is inserted with a friction fit into a recess 151 in the front shearing knife 132. Each tab portion 150 is also held within recess 151 by the die roll 13 which bears against it. Each insert 134 is aligned with a column of die cavities 14 so as to shear product contained therein as the die roll 13 rotates. The inserts 134 and recesses 151 are also somewhat wider than die cavities 14 to prevent the inserts from getting caught in the die cavities 14 as the die roll 13 rotates. The front cut-off knife 132, inserts 134 and backing knife 136 are preferably formed from Nylon.

As further shown in FIG. 3, each feed roll 105, 106 includes respective longitudinal tapered recesses or grooves 152, 154. As shown in FIG. 3, recesses 152, 154 taper in depth along their width and get deeper in a direction opposite to the respective directions of rotation 112, 114 of the feed rolls 105, 106, in other words, a direction away from pressure chamber 116. Unlike past machines, recesses 152, 154 are staggered with respect to one another such that, at the inlet 116a of pressure chamber 116, an outer extent or longitudinal edge of one recess will be directly opposed to an intermediate point and, more preferably, an approximate midpoint of an opposing recess when viewed in cross-section. For example, as shown in FIG. 3, outer edge 154a of a recess 154 on feed roll 106 is directly opposed to the approximate midpoint 152b of a recess 152 in feed roll 105 at the product inlet 116a of pressure chamber 116. The intermediate points 152b, 154b of the respective recesses 152, 154 are each defined as being disposed between the respective outer edges 152a, 152c, and 154a, 154c. This staggered relationship between recesses 152, 154 allows slippery food products such as, for example, ground meat, to be more easily fed into pressure chamber 116, and, in addition, allows products containing relatively large particulates to be fed through the inlet 116a of pressure chamber 116 without excessive damage to the particulates by the feed rolls 105, 106 as the product containing them is fed therebetween. The phase of one feed roll may also be adjusted by adjusting the position of the drive gear of one feed roll with respect to the other. This may be done in cases where the product does not contain particulates and where it would therefore be advantageous to have directly opposed recesses.

Turning now to FIGS. 1 and 2, the machine 10 further includes a system for lifting the feed rollers 105, 106 with respect to the die roll 13 and for allowing the die roll 13 to be rolled out of the machine 10. In this regard, a pair of fluid powered, preferably pneumatic cylinders 156, one of which is shown in FIG. 1, are mounted at opposite ends of the machine 10 by brackets 158 and include piston rods 160 connected to chains 162, 164 by way of a single chain 163. Each single chain 163 is directed over a single sprocket 165 and connected to the chains 162, 164 of a double chain which ride on the sprockets of a double sprocket 169. Chain 164 is further directed over a second single sprocket 171. Chains 162 are attached to opposite ends of feed rolls 106 while chains 164 are attached to the ends of feed roll 105 by bearings which allow rotation of the respective drive shafts of the feed rolls 105, 106. In this regard, and referring specifically to FIG. 2, chains 162 are shown to be attached to bearings 166 which rotatably receive the drive shaft 168 of feed roll 106. Although not specifically shown in the drawings, chains 164 are likewise attached to opposite ends of the drive shaft of feed roll 105 by way of bearings in a manner identical to chains 162 shown in FIG. 2.

It will be appreciated that each feed roll 105, 106 is identically mounted to the machine 10 and the following description with respect to the mounting of feed roll 106 applies equally to feed roll 105. The drive shaft 168 of feed roll 106 shown in FIG. 2 is rotatably supported at its opposite ends in bearings 170, 172. Bearings 170, 172 are locked in place between identical pairs of tracks 174 and within identical mounting fixtures 176 having arcuate recesses for receiving the respective bearings 170. The bearings 170, 172 of each feed roll 105, 106 are locked in this position by locking bars 178 which extend over the tops of the respective bearings 170, 172 disposed on opposite ends of the drive shafts of each of the feed rolls 105, 106. Slots 180, 182 are formed in the respective side plates 83, 84 for receiving the drive shafts and allowing vertical movement of the feed rolls 105, 106 with respect to the die roll 13.

The die roll 13 is also supported within slots 184, 186 in the respective side plates 83, 84 as shown in FIGS. 1 and 2. Slots 184, 186 allow the die roll to be moved laterally out of the machine 10 once the feed rolls 105, 106 have been lifted out of the way using pneumatic cylinders 156. Bearings 188, 190 at the outer ends of drive shaft 100 rest on respective rails 192, 194 and rotatably support the drive shaft 100 therein. The drive shaft 100 and, more specifically, bearings 188, 190 are locked and supported at the inner ends of slots 184, 186 by identical pairs of crescent shaped locking and supporting plates 196, 198 (FIG. 1). It will be appreciated that one pair of plates 196, 198 supports each bearing 188, 190. Plates 196 are preferably permanently secured to the machine 10 as by welding to the respective rails 192, 194. Plates 198 are removably attached to the corresponding rail 192 or 194 by way of a bolt 200. When the plates 198 are removed from both sides of the machine 10 and the feed rolls 105, 106 are lifted, the die roll 13 may be rolled out of the machine 10 by way of the bearings 188, 190 rolling along rails 192, 194. This allows the shaft 100 to move through the slots 184, 186 to be easily removed when necessary.

Although a preferred embodiment of the present invention has been detailed above, it will be readily appreciated by those of ordinary skill in the art that many modifications and substitutions thereto will become readily apparent. Therefore, applicant intends to be bound only by the scope of the claims appended hereto.

I claim:

1. Apparatus for producing configurated products comprising:

a frame;

a rotary die roll rotatably supported by said frame and having a plurality of die cavities arranged in a predetermined pattern in an outer surface thereof, and a pair of feed rolls rotatably supported by said frame and disposed adjacent said die roll and adjacent one another so as to define a nip between each of said feed rolls and said die roll and further defining a generally triangular cross section product material pressure chamber between peripheral surfaces of said feed rolls and said die roll for receiving viscous fluid product from between said feed rolls, at least one of said feed rolls having a feed roll shaft extending through first slots in said frame and supported in feed roll bearings attached to opposite ends of said feed roll shaft, said feed roll bearings being slidably mounted in tracks fixed to said frame adjacent said first slots and disposed on opposite ends of said one feed roll to allow movement of said one feed roll toward and away from said die roll and said die roll having a die roll shaft extending through second slots in said frame and supported in die roll bearings attached to opposite ends of said die roll shaft, said die roll bearings being supported for rolling movement on rails fixed to said frame adjacent said second slots such that said die roll may be rolled out of said apparatus while said die roll bearings are supported on said rails and after said one feed roll is moved away from said die roll, said die roll bearings being selectively locked in place proximate inner ends of said second slots but unlockable to allow said die roll bearings to roll along said rails.

2. The apparatus of claim 1 further comprising a powered mechanism for moving said one feed roll toward and away from said die roll.

3. The apparatus of claim 2 wherein said powered mechanism includes a fluid powered cylinder operatively connected to each end of said one feed roll.

4. The apparatus of claim 1 wherein both feed rolls of said pair of feed rolls include respective feed roll shafts extending through first slots in said frame and supported in feed roll bearings attached to opposite ends of said feed roll shafts, laid feed roll bearings being mounted in tracks fixed to said frame adjacent said first slots and disposed at opposite ends of said feed rolls to allow movement of said feed rolls toward and away from said die roll, said feed roll bearings being selectively locked in place proximate inner ends of said first slots but unlockable to allow said feed roll bearings to slide in said tracks.

5. The apparatus of claim 4 further comprising a powered mechanism for moving said feed rolls toward and away from said die roll.

6. The apparatus of claim 5 wherein said powered mechanism comprises a fluid powered cylinder operatively connected to each end of said feed rolls.

7. The apparatus of claim 4 further comprising:

a cutoff knife extending into the nip between one of said feed rolls and said die roll and a backing knife extending into the nip between the other of said feed rolls and said die roll, wherein said feed rolls may be moved away from said die roll a distance sufficient to remove said die roll, said cutoff knife and said backing knife from said apparatus.

8. The apparatus of claim 7 wherein said rails for supporting said die roll bearings are horizontally disposed to facilitate rolling movement of said die roll bearings on said rails.

9. The apparatus of claim 7 wherein said die cavities are arranged in a plurality of rows extending longitudinally along an outer surface of said die roll and about the circumference thereof and wherein a plurality of relief members extend from said backing knife into said pressure chamber, each relief member being disposed between adjacent die cavities in said rows of cavities on said die roll.

10. The apparatus of claim 9 wherein each relief member includes side surfaces which taper outwardly from a top surface of said relief member.

11. The apparatus of claim 1 further comprising:
a cutoff knife extending into the nip between one of said feed rolls and said die roll and a backing knife extending into the nip between the other of said feed rolls and said die roll, wherein said die cavities are arranged in a plurality of rows extending longitudinally along an outer surface of said die roll and about the circumference thereof and wherein a plurality of relief members extend from said backing knife into said pressure chamber, each relief member being disposed between adjacent die cavities in said rows of cavities on said die roll.

12. The apparatus of claim 11 wherein each relief member includes side surfaces which taper outwardly from a top surface of said relief member.

13. The apparatus of claim 1 wherein each of said feed rolls include an outer surface having a series of longitudinally extending grooves, a product inlet being defined between said feed rolls for receiving viscous fluid product into said pressure chamber and wherein the grooves of one feed roll occupy different angular positions than the grooves of the other feed roll such that an outer longitudinal edge of a groove in said one feed roll is directly opposed to an intermediate point of a groove in said other feed roll when said grooves pass by said product inlet during rotation of said feed rolls.

14. The apparatus of claim 13 wherein the respective grooves in each feed roll taper in depth such that said grooves become deeper across their width in a direction opposite to the direction of rotation of the respective feed rolls.

15. The apparatus of claim 13 wherein said intermediate point is an approximate midpoint of said groove in said other feed roll.

16. The apparatus of claim 1 wherein said feed rolls are rotated by a torque controlled drive motor, wherein a torque value may be set and the speed of rotation of said feed rolls automatically varies as a function of the amount and viscosity of product being fed therebetween.

17. The apparatus of claim 1 wherein said cavities are arranged in a series of longitudinal rows and circumferential columns and further including a cutoff knife extending into the nip between one of said feed rolls and said die roll and having a plurality of removable shearing knife inserts, said inserts bearing against said die roll and each being disposed over a column of said cavities.

18. Apparatus for producing configured products comprising:
a frame;
a rotary die roll rotatably supported by said frame and having a plurality of die cavities arranged in a predetermined pattern in an outer surface thereof, and
first and second rotary feed rolls rotatably mounted to said frame adjacent said die roll and one another so as to define a nip between each of said feed rolls and said die roll and further defining a generally triangular cross section product material pressure chamber between peripheral surfaces of said feed rolls and said die roll, each of said feed rolls including an outer surface having a series of longitudinally extending grooves, wherein a product inlet is defined between said first and second rotary feed rolls for receiving viscous fluid product into said pressure chamber and the grooves of said first feed roll occupy different angular positions than the grooves of said second feed roll such that an outer longitudinal edge of a groove in said first feed roll is directly opposed to an intermediate point of a groove in said second feed roll when said grooves pass by said product inlet during rotation of said feed rolls.

19. The apparatus of claim 18 wherein the respective grooves in each feed roll taper in depth such that said grooves become deeper across their width in a direction opposite to the direction of rotation of the respective feed rolls.

20. The apparatus of claim 18 wherein said intermediate point is an approximate midpoint of said groove in said second feed roll.

21. The apparatus of claim 18 further comprising:
a cutoff knife extending into the nip between one of said feed rolls and said die roll and a backing knife extending into the nip between the other of said feed rolls and said die roll, wherein said die cavities are arranged in a plurality of rows extending longitudinally along an outer surface of said die roll and about the circumference thereof and wherein a plurality of relief members extend from said backing knife into said pressure chamber, each relief member being disposed between adjacent die cavities in said rows of cavities on said die roll.

22. The apparatus of claim 21 wherein each relief member includes side surfaces which taper outwardly from a top surface of said relief member.

23. The apparatus of claim 18 wherein said feed rolls are rotated by a torque controlled drive motor, wherein a torque value may be set and the speed of rotation of said feed rolls automatically varies as a function of the amount and viscosity of product being fed therebetween.

24. The apparatus of claim 18 wherein said cavities are arranged in a series of longitudinal rows and circumferential columns and further including a cutoff knife extending into the nip between one of said feed rolls and said die roll and having a plurality of removable shearing knife inserts, said inserts bearing against said die roll and each being disposed over a column of said cavities.

25. Apparatus for producing configured products comprising:

a frame;
a rotary die roll rotatably supported by said frame and having a plurality of cavities arranged in a series of longitudinal rows and circumferential columns;
a pair of feed rolls rotatably supported by said frame and disposed adjacent said die roll and one another so as to define a nip between each of said feed rolls and said die roll and further defining a generally triangular cross section product material pressure chamber between peripheral surfaces of said feed rolls and said die roll for receiving viscous fluid product from between said feed rolls; and,
a cutoff knife extending into the nip between one of said feed rolls and said die roll and having a plurality of removable shearing knife inserts, said inserts bearing against said die roll and each being disposed over a column of said cavities, said shearing knife inserts each having a shearing leading edge exposed to said pressure Chamber.

26. The apparatus of claim 25 wherein said shearing leading edge angles upwardly and inwardly toward said pressure chamber.

27. The apparatus of claim 25 wherein said inserts are formed of Nylon.

28. The apparatus of claim 27 wherein said shearing leading edge angles upwardly and inwardly toward said pressure chamber.

29. The apparatus of claim 25 wherein said feed rolls are rotated by a torque controlled drive motor, wherein a torque value may be set and the speed of rotation of said feed rolls automatically varies as a function of the amount and viscosity of product being fed therebetween.

30. Apparatus for producing configurated products comprising:
a frame;
a rotary die roll rotatably supported by said frame and having a plurality of cavities arranged in a series of longitudinal rows and circumferential columns;
a pair of feed rolls rotatably supported by said frame and disposed adjacent said die roll and one another so as to define a nip between each of said feed rolls and said die roll and further defining a generally triangular cross section product material pressure chamber between peripheral surfaces of said feed rolls and said die roll for receiving viscous fluid product from between said feed rolls;
a backing knife extending into the nip between one of said feed rolls and said die roll; and,
a plurality of relief members connected to said backing knife and extending into said pressure chamber, each of said relief members being disposed between adjacent columns of cavities in said die roll.

31. The apparatus of claim 30 wherein said backing knife extends into and occupies a portion of said product material pressure chamber.

32. The apparatus of claim 31 further comprising a cutoff knife extending into the nip between the other of said feed rolls and said die roll.

33. The apparatus of claim 32 wherein said cutoff knife includes a plurality of shearing knife inserts, said inserts bearing against said die roll and each being disposed over a column of said cavities.

34. The apparatus of claim 33 wherein said inserts are formed of Nylon.

35. The apparatus of claim 30 wherein said feed rolls are rotated by a torque controlled drive motor, wherein a torque value may be set and the speed of rotation of said feed rolls automatically varies as a function of the amount and viscosity of product being fed therebetween.

36. The apparatus of claim 30 wherein each relief member includes side surfaces which taper outwardly from a top surface of said relief member.

* * * * *